Sept. 2, 1941.   J. TESKA   2,254,632
AUTOMATIC BRAKE FOR BABY CARRIAGES
Filed Feb. 29, 1940
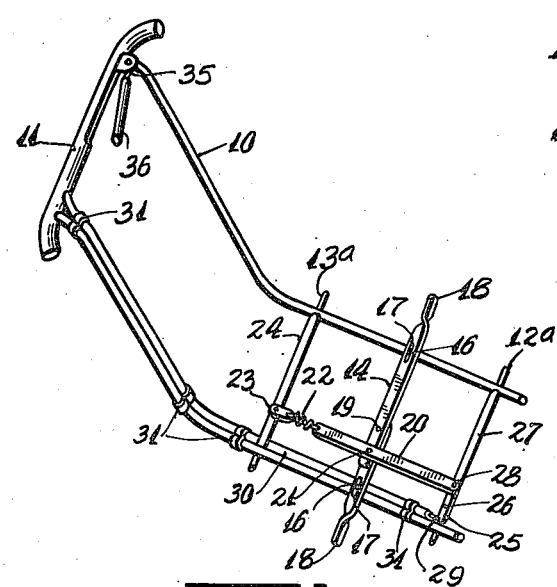
Fig. 1.
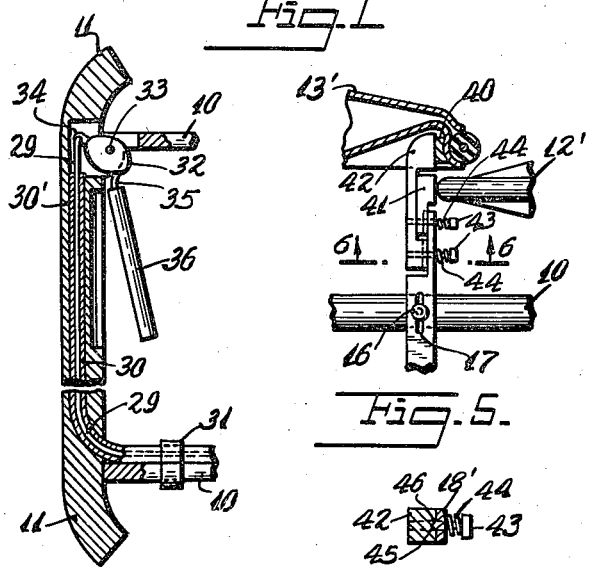
Fig. 2.
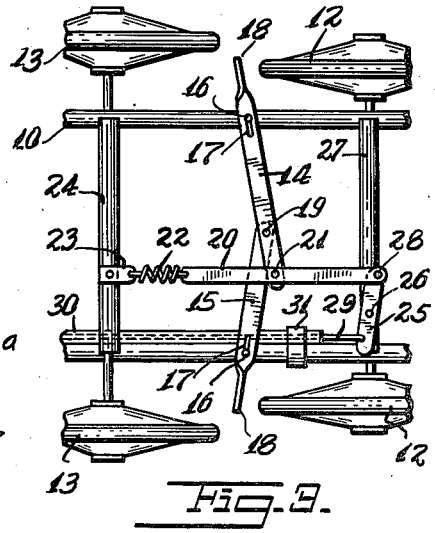
Fig. 3.
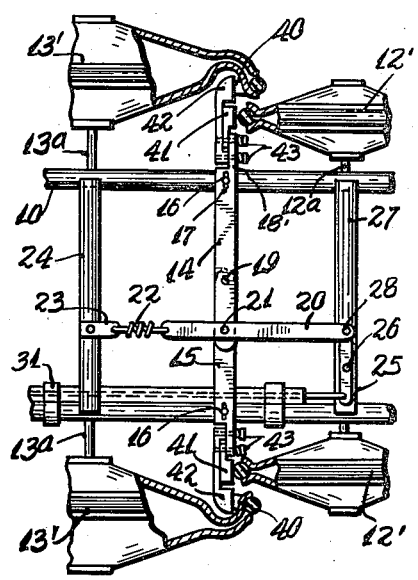
Fig. 4.
Fig. 5.
Fig. 6.
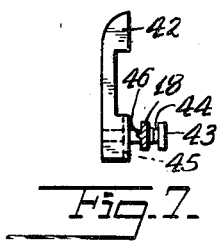
Fig. 7.
INVENTOR
John Teska
BY
ATTORNEY Patented Sept. 2, 1941

2,254,632

UNITED STATES PATENT OFFICE 2,254,632

AUTOMATIC BRAKE FOR BABY CARRIAGES

John Teska, New York, N. Y.

Application February 29, 1940, Serial No. 321,374

6 Claims. (Cl. 188—20)

This invention relates to new and useful improvements in an automatic brake for baby carriages.

The invention has for an object the construction of a brake for baby carriages which automatically is released when one correctly operates the handle for propelling the carriage.

More specifically, the invention contemplates a novel arrangement of brake arms and associated mechanism for controlling the automatic engagement and disengagement of the brakes.

Still further the invention proposes an arrangement whereby the braking action is cooperative with the front wheels or the rear wheels, or all of these wheels simultaneously.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a baby carriage frame constructed according to this invention.

Fig. 2 is a horizontal sectional view of the handle portion of the baby carriage.

Fig. 3 is a fragmentary plan view of the frame of the baby carriage shown with the wheels in position and the brake inoperative.

Fig. 4 is a fragmentary plan view similar to Fig. 3, but showing a modification of the invention.

Fig. 5 is a fragmentary enlarged detailed view of a portion of Fig. 4.

Fig. 6 is a sectional view taken on the line 6—6 of Fig. 5.

Fig. 7 is a view of the parts shown in Fig. 6 but with one of the parts in a different position.

The automatic brake for baby carriages, in accordance with this invention, is used in combination with a baby carriage having a frame 10 with a handle portion 11 at the rear end wheels 12 at the front and other wheels 13 at the rear. These wheels are mounted respectively on a front axle 12$^a$ and a rear axle 13$^a$ secured in a conventional manner on the frame 10. A pair of brake arms 14 and 15 are arranged transversely of the frame 10 and are pivotally supported intermediate of their ends on the frame to pivot and slide slightly. This construction is obtained by pintles 16 mounted upon the frame 10 and engaging through slots 17 formed in the brake arms. Each brake arm has a projecting end portion 18 for engaging against a side wheel of the baby carriage. As illustrated in Fig. 3 the projecting end portions are adapted to engage the front wheels 12.

A pintle 19 pivotally connects the inner end of the brake arm 15 with an intermediate point of the brake arm 14. A longitudinally extending rod 20 is pivotally connected by a pintle 21 with the inner end of the brake arm 14. Resilient means in the form of a spring 22 normally urges the rod 20 rearwards. This spring is connected between a bracket 23 mounted upon a transverse bar 24, secured on the frame 10. The other end of the spring 22 connects with the rear end of the rod 20.

A lever 25 is disposed transversely with respect to the frame 10 and is pivotally mounted by a pintle 26 intermediate of its ends upon a bar 27 fixedly mounted on the frame 10. A pintle 28 pivotally connects the inner end of the lever 25 with the front end of the rod 20. A cable 29 is connected with the outer end of the lever 25.

The cable 29 is guided through a stationary casing 30 supported upon the frame 10 at several points along its length by brackets 31. The casing terminates at the point 30' within the handle 11. At this point the cable 29 projects and is attached to pivotally mounted cam 32.

More specifically, the cam 32 is pivotally supported by means of a pin 33 at the point of connection between one of the side members of the frame 10 and the handle 11. The end of the cable 29 is attached to the peripheral edge of the cam 32 by means of a rivet 34. One side of the cam 32 is formed with an extension 35. An auxiliary handle 36 is mounted on the extension 35 and is normally urged into a position in which it is spaced from the handle 11 by the spring 22 and the other mechanism interposed therebetween. The handle 11 is made of circular material in cross section and the auxiliary handle 36 is made of semi-circular material in cross section. When the baby carriage is being pushed the auxiliary handle 36 must be urged against the handle 11 for releasing the brakes.

When the auxiliary handle 36 is manually urged into contact with the handle 11 it will cause the cam 32 to be pivoted to draw the cable 29. Drawing the cable 29 will cause the lever 25 to pivot and move the longitudinal rod 20. This pivots the brake arms 14 and 15 into inoperative positions as shown in Fig. 3. When one is no longer pushing the carriage and the auxiliary handle 36 is released the spring 22 will return the parts to their original position and cause the ends of the brake arms 14 and 15 to again engage the wheels 12.

In Figs. 4 to 7 inclusive, a modified form of the invention has been disclosed which distinguishes from the prior form in the construction of the projecting ends 18' of the brake arms and in the relationship of these projecting ends with the wheels of the carriage. In this form of the invention the carriage is provided with front wheels 12' and rear wheels 13' spaced outside of the front wheels 12' and having overlapping edge portions. These overlapping edge portions are provided with an internal annular brake drum 40.

Each projecting end portion 18' is provided with a pair of brake shoes 41 and 42. These brake shoes are resiliently supported on the end portion 18' by screws 43 and spring 44. The screws 43 are fixedly mounted upon the inner ends of the brake shoes 41 and 42 and pass freely through openings in the projecting end portions 18'. The springs 44 act between the heads of the screws and the adjacent face of the projecting portion 18' for resiliently holding the brake shoes extended horizontally in fixed positions or vertically as hereinafter further described. Each brake shoe is provided with a groove 45 into which a rib 46 from the projecting portion 18' extends to assist in holding the brake shoes horizontally.

The brake shoe 41 is arranged within the brake shoe 42 as clearly shown in Fig. 5. These brake shoes are also arranged to simultaneously engage the edge of the wheel 12' and the brake drum 40 of the wheel 13'. When desired one or the other of the brake shoes may be pivoted upwards to vertical inoperative positions. In Fig. 7 the brake shoe 42 is illustrated pivoted to its vertical inoperative position. For this reason the brake devices may be adjusted so that only the inner brake shoes function or that only the outer brake shoes function, or that both function simultaneously. The purpose of this adjustment is to increase the life of the brake since the parts may be used so as to spare others and better braking action may be obtained when desired. In other respects this form of the invention is similar to the previous form.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a baby carriage having a frame with a handle portion at the rear and wheels at the sides, a pair of brake arms transversely of the frame and pivotally and slightly slidably mounted on the sides of the frame and having projecting end portions engaging said side wheels, a pintle pivotally connecting the inner end of one of said brake arms with an intermediate portion of the other, a longitudinal rod pivotally connected with the free inner end of said latter brake arm, resilient means urging said rod rearwards, a pivoted transverse lever connected at one end with said rod, a cable connected with the other end of said lever, means guiding said cable rearwards to said handle, movable elements on said handle for drawing said cable to move the brake arms free from said side wheels, additional side wheels on said frame and having internal brake drums, and brake shoes mounted on said brake arms for engaging the said brake faces.

2. In combination with a baby carriage having a frame with a handle portion at the rear and wheels at the sides, a pair of brake arms transversely of the frame and pivotally and slightly slidably mounted on the sides of the frame and having projecting end portions engaging said side wheels, a pintle pivotally connecting the inner end of one of said brake arms with an intermediate portion of the other, a longitudinal rod pivotally connected with the free inner end of said latter brake arm, resilient means urging said rod rearwards, a pivoted transverse lever connected at one end with said rod, a cable connected with the other end of said lever, means guiding said cable rearwards to said handle, movable elements on said handle for drawing said cable to move the brake arms free from said side wheels, additional side wheels on said frame and having internal brake drums, and brake shoes mounted on said brake arms for engaging the said brake faces, other brake shoes mounted on said brake arms for comprising the contacting portions of said brake arms with said first mentioned side wheels.

3. In combination with a baby carriage having a frame with a handle portion at the rear and wheels at the sides, a pair of brake arms transversely of the frame and pivotally and slightly slidably mounted on the sides of the frame and having projecting end portions engaging said side wheels, a pintle pivotally connecting the inner end of one of said brake arms with an intermediate portion of the other, a longitudinal rod pivotally connected with the free inner end of said latter brake arm, resilient means urging said rod rearwards, a pivoted transverse lever connected at one end with said rod, a cable connected with the other end of said lever, means guiding said cable rearwards to said handle, movable elements on said handle for drawing said cable to move the brake arms free from said side wheels, additional side wheels on said frame and having internal brake drums, and brake shoes mounted on said brake arms for engaging the said brake faces, other brake shoes mounted on said brake arms for comprising the contacting portions of said brake arms with said first mentioned side wheels, said brake shoes being resiliently mounted.

4. In combination with a baby carriage having a frame with a handle portion at the rear and wheels at the sides, a pair of brake arms transversely of the frame and pivotally and slightly slidably mounted on the sides of the frame and having projecting end portions engaging said side wheels, a pintle pivotally connecting the inner end of one of said brake arms with an intermediate portion of the other, a longitudinal rod pivotally connected with the free inner end of said latter brake arm, resilient means urging said rod rearwards, a pivoted transverse lever connected at one end with said rod, a cable connected with the other end of said lever, means guiding said cable rearwards to said handle, movable elements on said handle for drawing said cable to move the brake arms free from said side wheels, additional side wheels on said frame and having internal brake drums, and brake shoes mounted on said brake arms for engaging the said brake faces, other brake shoes mounted on said brake arms for comprising the contacting portions of said brake arms with said first mentioned side wheels, said brake shoes being resiliently mounted, and movably mounted to be movable individually to cooperative or inoperative positions.

5. In combination with a baby carriage having a frame with a handle portion at the rear and front and rear wheels at the sides, a pair of brake arms pivotally mounted on said frame transversely thereof and having their outer ends extended to a position substantially between said wheels, resilient means urging said brake arms into a position in which said outer ends will engage said front and rear wheels to prevent rotation thereof, manually operable means for pivoting said brake arms against the holding action of said resilient means to disengage the ends of said brake arms from said wheels to free the same to rotate, and individual brake shoes pivotally mounted on the outer end of each of said brake arms, and each of said shoes being engageable with either said front or rear wheels.

6. In combination with a baby carriage having a frame with a handle portion at the rear and front and rear wheels at the sides, a pair of brake arms pivotally mounted on said frame transversely thereof and having their outer ends extended to a position substantially between said wheels, resilient means urging said brake arms into a position in which said outer ends will engage said front and rear wheels to prevent rotation thereof, manually operable means for pivoting said brake arms against the holding action of said resilient means to disengage the ends of said brake arms from said wheels to free the same to rotate, and individual brake shoes pivotally mounted on the outer end of each of said brake arms, and each of said shoes being engageable with either said front or rear wheels, said brake shoes being individually movable to inoperative position to permit its respective wheel to be free when said resilient means urges said brake arms into position in which its ends move to engage said wheels.

JOHN TESKA.